(12) United States Patent
Ben-Natan

(10) Patent No.: US 8,243,262 B2
(45) Date of Patent: Aug. 14, 2012

(54) METHOD AND SYSTEM FOR SUPPORTING A MOVING OPTICAL COMPONENT ON A SLOPED PORTION

(75) Inventor: Arnon Ben-Natan, Tivon (IL)

(73) Assignee: Camtek Ltd., Migdal Haemek, IL (US)

( * ) Notice: Subject to any disclaimer, the term of this patent is extended or adjusted under 35 U.S.C. 154(b) by 280 days.

(21) Appl. No.: 12/524,002

(22) PCT Filed: Jan. 24, 2008

(86) PCT No.: PCT/IL2008/000111
§ 371 (c)(1), (2), (4) Date: Dec. 29, 2009

(87) PCT Pub. No.: WO2008/090559
PCT Pub. Date: Jul. 31, 2008

(65) Prior Publication Data
US 2010/0091271 A1 Apr. 15, 2010

Related U.S. Application Data

(60) Provisional application No. 60/886,663, filed on Jan. 26, 2007.

(51) Int. Cl.
*G01N 21/00* (2006.01)
(52) U.S. Cl. .................................. 356/237.1
(58) Field of Classification Search .... 356/237.1–237.5, 356/244–246, 601–626
See application file for complete search history.

(56) References Cited

U.S. PATENT DOCUMENTS

| 4,985,651 | A | 1/1991 | Chitayat | |
|---|---|---|---|---|
| 2006/0001416 | A1 | 1/2006 | West | |
| 2007/0247639 | A1* | 10/2007 | Amstel et al. | 356/601 |
| 2011/0102547 | A1* | 5/2011 | Sul et al. | 348/46 |

FOREIGN PATENT DOCUMENTS

| DE | 296 06 317 | 7/1996 |
|---|---|---|
| GB | 2 087 836 | 6/1982 |
| WO | WO 02/33308 | 4/2002 |
| WO | WO 03/067109 | 8/2003 |

OTHER PUBLICATIONS

International Search Report for International Application No. PCT/IL2008/000111 mailed May 30, 2008.

* cited by examiner

*Primary Examiner* — Hoa Pham
(74) *Attorney, Agent, or Firm* — Reches Patents

(57) ABSTRACT

A device and a method for supporting an optical component (240) of an optical evaluation system, the device includes: (a) a supporting element (220) that includes a sloped portion (222); (b) at least one movement control component (210) that is coupled to the sloped portion; and (c) a movable element (230), adapted to move along the at least one movement control component; wherein the movable element is adapted to support the optical component; wherein when the movable element supports the optical component a center Of gravity of a combination of the movable element and the optical component is positioned above, the sloped portion or in proximity to the sloped portion.

20 Claims, 6 Drawing Sheets

```
┌─────────────────────────────────────────────────────────────────────┐
│                              510                                    │
│       receiving a request to alter a position of the optical component. │
└─────────────────────────────────────────────────────────────────────┘
                                    │
┌─────────────────────────────────────────────────────────────────────┐
│                              520                                    │
│  moving a movable element along at least one movement control component so as to │
│    affect the location of the optical component; wherein the optical components is │
│      supported by the movable element; wherein the at least one movement control │
│   component is connected to a sloped portion of a supporting element; wherein when │
│          the movable element supports the optical component a center of gravity of a │
│      combination of the movable element and the optical component is positioned above │
│              the sloped portion or in proximity to the sloped portion.             │
│                                                                     │
│   ┌─────────────────────────────────────────────────────────────┐   │
│   │   522 of moving the movable element along multiple movement control │   │
│   │  components that are parallel to each other; wherein the multiple movement │   │
│   │    control components are supported by multiple supporting elements │   │
│   └─────────────────────────────────────────────────────────────┘   │
└─────────────────────────────────────────────────────────────────────┘
                                    │
┌─────────────────────────────────────────────────────────────────────┐
│                              530                                    │
│     moving the optical component along at least one additional movement control │
│       component that is connected to the movable element; wherein the at least one │
│  additional movement control component is not parallel to the at least one movement │
│                           control component                          │
│                                                                     │
│   ┌─────────────────────────────────────────────────────────────┐   │
│   │                          532                                │   │
│   │   vertically moving the optical component along at least one additional │   │
│   │     movement control component that is connected to the movable element │   │
│   └─────────────────────────────────────────────────────────────┘   │
│                                                                     │
│   ┌─────────────────────────────────────────────────────────────┐   │
│   │                          534                                │   │
│   │   vertically moving the optical component along at least one additional │   │
│   │  movement control component that is connected to a highly accurate vertical │   │
│   │    portion of the movable element; wherein the movable element is massive │   │
│   └─────────────────────────────────────────────────────────────┘   │
└─────────────────────────────────────────────────────────────────────┘
```

Figure 5

METHOD AND SYSTEM FOR SUPPORTING A MOVING OPTICAL COMPONENT ON A SLOPED PORTION

CROSS-REFERENCE TO RELATED APPLICATIONS

This application is a National Phase Application of PCT International Application No. PCT/IL2008/000111, entitled "METHOD AND SYSTEM FOR SUPPORTING A MOVING OPTICAL COMPONENT ON A SLOPED PORTION", International Filing Date Jan. 24, 2008, published on Jul. 31, 2008 as International Publication No. WO 2008/090559, which in turn claims from U.S. Provisional Patent Application No. 60/886,663, filed Jan. 26, 2007, both of which are incorporated herein by reference in their entirety.

BACKGROUND OF THE INVENTION

Inspection of objects, such as but not limited to electrical circuits (wafers, masks, printed circuit boards and the like) can involve mechanically moving an inspection head above the inspected object by a motion system. The motion system can move the inspection head along two or even three axes. An XY motion system can move the inspection head along two axes while a XYZ motion system can move the inspection head along three axes.

The motion system has to be highly accurate and to be characterized by a short damping time. The motion system usually includes rails or other movement control components as well as a moving part (that can include a driving unit or be moved by a driving unit) and optionally auxiliary equipment (such as electrical cards, fiber optic and the like).

FIG. 1 illustrates a part of an exemplary prior art XY motion system 100, in which a pair of parallel horizontal rails 110 are connected to vertical surface 120 (such as a sidewall of rectangular rod, as illustrated in FIG. 1) so that one horizontal rail 110 is positioned exactly above the other horizontal rail 110. The rectangular rod can move along an axis that is perpendicular to the rails, thus providing movement along two axes.

Moving component 130 can move along rails 110 while the center of gravity of a combination of moving component 130 and auxiliary equipment 140 is positioned away from the pair of horizontal rails 110.

FIG. 2 is a side view illustration of the part of the exemplary prior art XY motion system 100. Center of gravity 190 is the center of gravity of moving component 130 and auxiliary equipment 140, and lever distance 192 is the horizontal distance between center of gravity 190 and the pair of parallel horizontal rails 110. The force applied by the mass of moving component 130 and auxiliary equipment 140 over a lever of the length of lever distance 192 can affect the performance of the movement system. This force can deform rails 110. Additionally or alternatively, it can cause moving component 130 to slightly tilt backwards.

There is a need to provide an improved device and method for supporting an optical component of an optical evaluation system.

SUMMARY OF THE INVENTION

A device for supporting an optical component of an optical evaluation system, the device includes: (a) a supporting element that includes a sloped portion; (b) at least one movement control component that is connected to the sloped portion; and (c) a movable element, adapted to move along the at least one movement control component; wherein the movable element is adapted to support the optical component; wherein when the movable element supports the optical component a center of gravity of a combination of the movable element and the optical component is positioned above the sloped portion or in proximity to the sloped portion.

A method for supporting an optical component of an optical evaluation system, the method includes: (a) receiving a request to alter a position of the optical component; and (b) moving a movable element along at least one movement control component so as to affect the location of the optical component; wherein the optical components is supported by the movable element; wherein the at least one movement control component is connected to a sloped portion of a supporting element; wherein when the movable element supports the optical component a center of gravity of a combination of the movable element and the optical component is positioned above the sloped portion or in proximity to the sloped portion.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which:

FIG. 5 illustrates a method for supporting an optical component of an optical evaluation system, according to an embodiment of the invention.

DETAILED DESCRIPTION OF THE DRAWINGS

In the description of the invention, the term "optical component" can mean a camera, lenses, an illumination source and so forth; the term "optical evaluation system" can mean an inspection system, an evaluation system, a metrology system.

XYZ motion systems are different from XY motion system such as exemplary prior art motion system 100 by being able to move accurately move the auxiliary equipment, such as an optical component, in three dimensions, rather than only two dimensions, as applicable in XY motion systems. In optical systems, such as XYZ inspections systems referred to in the background, the XYZ motion system can move a inspection head along three axes, wherein conventionally the X and Y axes represent an XY inspection plane, and the Z axis is conventionally perpendicular to the XY inspection plane. The ability to accurately move the inspection head over the Z axis (i.e. to bring the inspection head closer or further from the inspected objects) facilitates accurate control over different optical parameters, and especially to achieve accurate focus, which is required for precise inspection. It is however clear to a person who is skilled in the art that if the motion system experience a deformation of the rails or of other parts of the motion system, the movement of the inspection system (or any other auxiliary equipment) over the Z-axis is no longer perpendicular to the inspection plane, and therefore the inspection is no longer precise, or the image acquired is no longer focused enough to enable the inspection.

Figure 1:
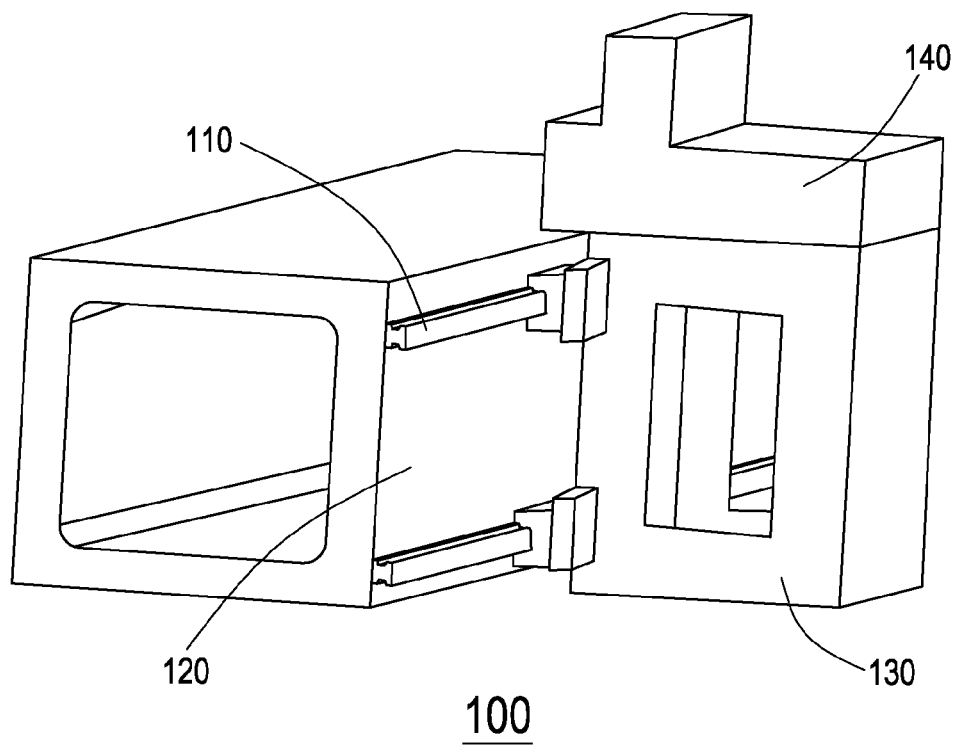
FIG. 1 illustrates a part of an exemplary prior art XY motion system.
Figure 2:
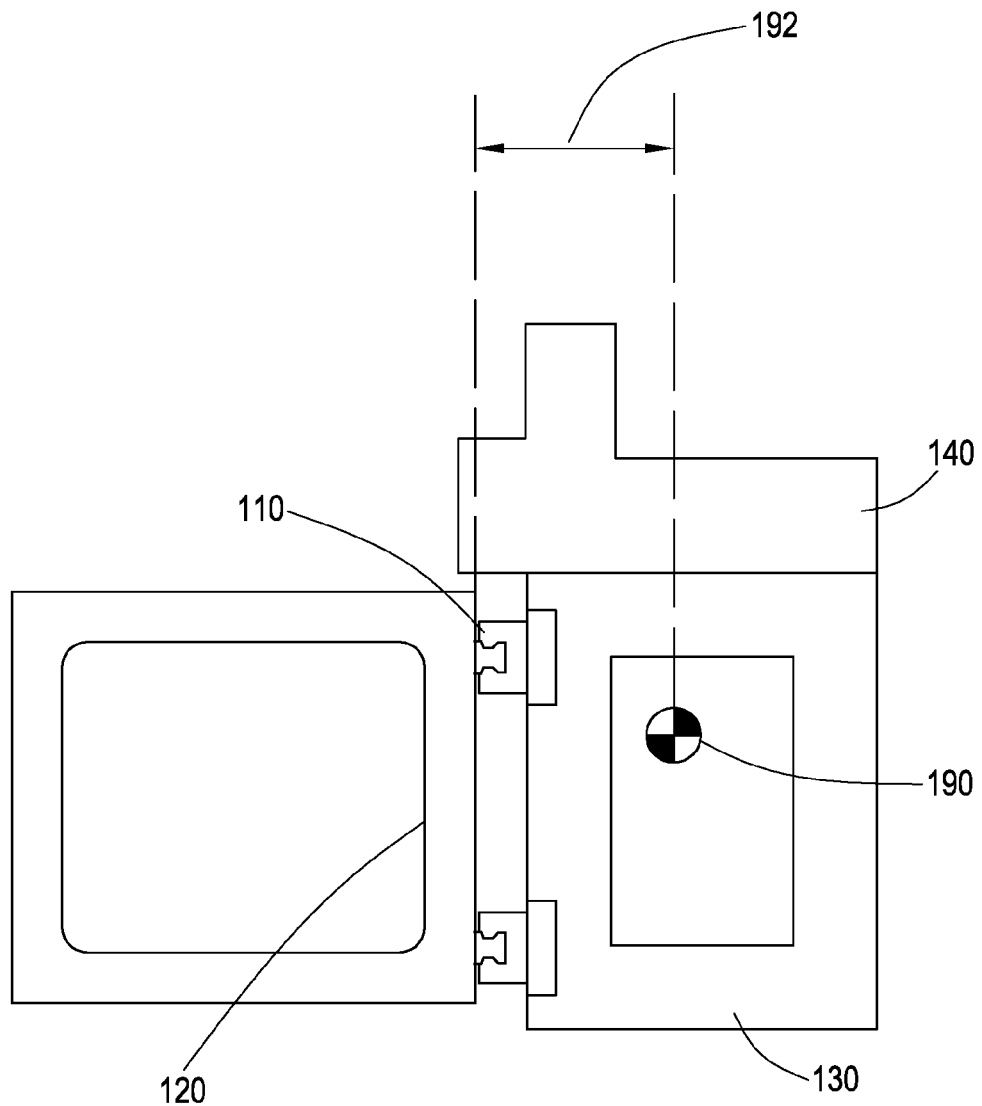
FIG. 2 is a side view illustration of the part of the exemplary prior art XY motion system.
Figure 3:
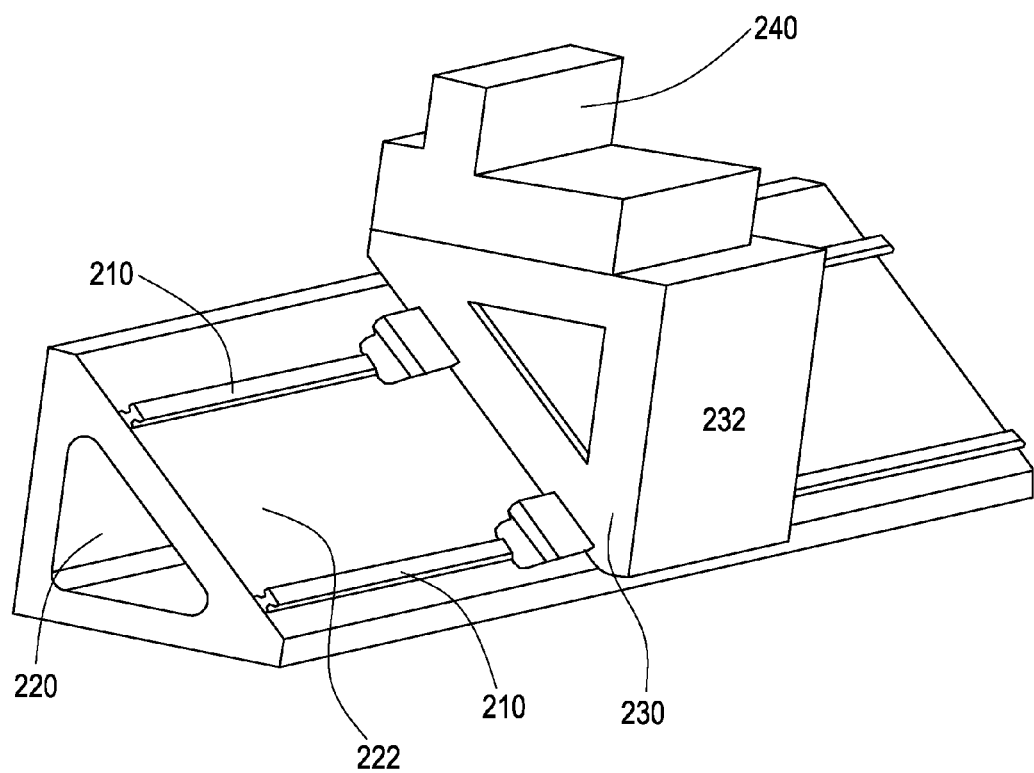
FIG. 3 illustrates a device, according to an embodiment of the invention.

FIG. 3 illustrates device 200, according to an embodiment of the invention. Device 200 is usually a part of an inspection system, a metrology system, a verification station and the like. Device 200 includes supporting element 220 that includes sloped portion 222. At least one movement control component 210 is connected to sloped portion 222. Device 200 further includes movable element 230, which is adapted to move along the at least one movement control component 210 (which are, according to an embodiment of the invention, rails); wherein the movable element 230 is adapted to support optical component 240. When movable element 230 supports optical component 240, a center of gravity of a combination of movable element 230 and optical component 240 is positioned above sloped portion 222 or in proximity to sloped portion 222. It is noted that conveniently, if movable element 230 supports more than a single optical component 240, or additional non-optical components, it is the center of gravity of the combination of movable object 230, the one or more optical components 240 and the one or more non-optical components (if any) that is positioned above sloped portion 222 or in proximity to sloped portion 222.

It is noted that, according to an embodiment of the invention, device 200 includes multiple supporting elements 220 that support multiple movement control components 210 that are parallel to each other.

Conveniently, movable element 230 is relatively massive in comparison to optical component 240, and therefore a replacing of optical component 240 or adding of additional (optical or non-optical components) without substantially moving the center of gravity of the combination is facilitated. It is noted that, conveniently, movable element 230 has a substantially rectangular cross section.

According to an embodiment of the invention, movable element 230 supports optical component 240, wherein the center of gravity of the combination of movable element 230 and optical component 240 (and/or of additional components as described above) is positioned substantially above a center of sloped portion 222.

Figure 4A:
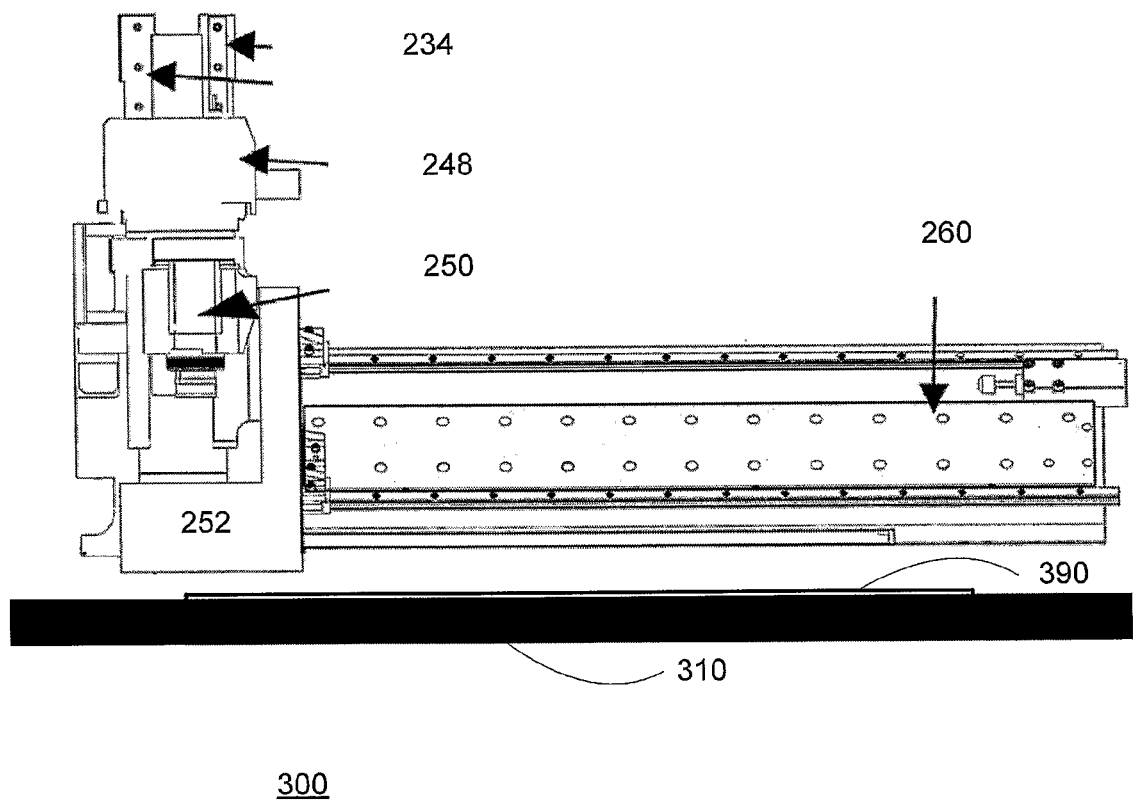
FIGS. 4a and 4b illustrate an inspection system which includes the device, according to an embodiment of the invention.
Figure 4B:
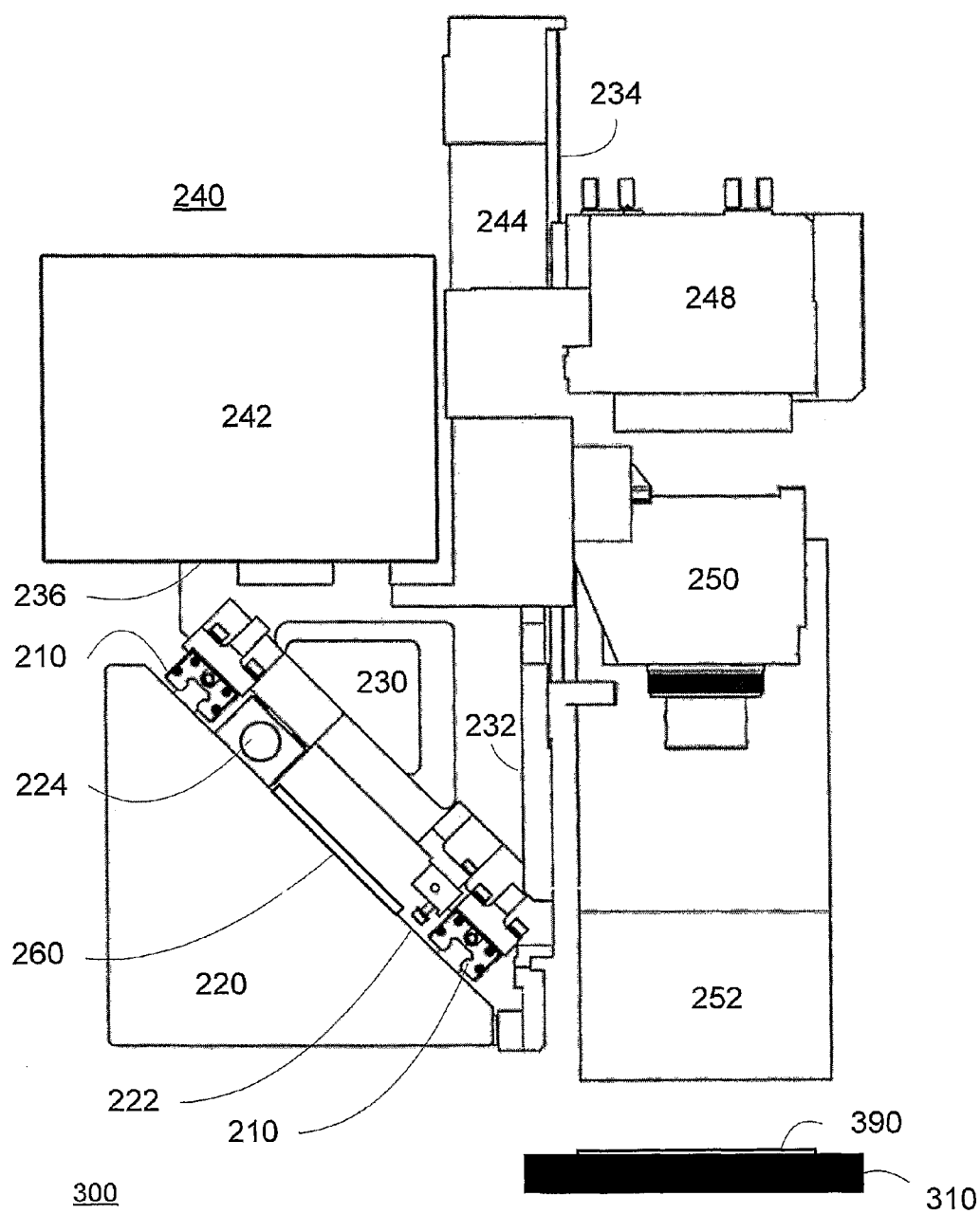

FIGS. 4a and 4b illustrate inspection system 300 which includes device 200, according to an embodiment of the invention, wherein FIG. 4a is a front view of inspection system 300, and FIG. 4b is a side view thereof. System 300 includes device 200, and vacuum table 310, that is adapted to fix inspected panel 390 (or other inspected object) in a fixed location.

According to an embodiment of the invention, movement control element 210 is a magnetic rail and wherein movable element 230 includes at least one armature of a linear motor. According to an embodiment of the invention, supporting element 220 includes (or supports), linear motor 260 (which is conveniently attached to sloped portion 222), which is adapted to control a motion of movable element 230, wherein movement control elements 210 are rails, which are adapted to limit the movement of movable element 230 to an axis strictly parallel to sloped potion 222 (which is typically horizontal). It is noted that an open linear motor is offers a very good support to the attraction force induced between movement control element 210 and movable element 230.

According to an embodiment of the invention, device 200 further includes at least shock absorber 224 which is conveniently connected to supporting element 220 (or to movement control element 210), and which is adapted to limit the movement of movable element 230 to a limited distance over the axis parallel to sloped portion 222.

According to an embodiment of the invention, at least one additional movement control component 234 is connected to movable element 230 so as to enable vertical movement of optical component 240. According to an embodiment of the invention, at least one additional movement control component 234 is connected to movable element 230; wherein optical component 240 is adapted to move along the at least one additional movement control component 234; wherein the at least one additional movement control component 234 is not parallel to the at least one movement control component 210. According to an embodiment of the invention which is illustrated in FIGS. 4a and 4b, the at least one additional movement control component 234 are linear vertical rails.

According to an embodiment of the invention, movable element 230 is massive and includes a highly accurate vertical portion 232 to which at least one additional movement control component 234 is connected; wherein optical component 240 is adapted to move along the at least one additional movement control component 234.

According to an embodiment of the invention, optical component 240 includes a charge coupled device (detector) 248, which is adapted to capture images of inspected panel 390, which is illuminated by illumination block 252, and wherein the light reflecting from inspected panel 290 is converged toward CCD 248 by lens 250. According to an embodiment of the invention, device 200 further includes main optic carrier 244 which is adapted to transfer optical signals.

According to an embodiment of the invention, movable element 230 has an upper horizontal portion 236 adapted to support at least one additional component. According to an embodiment of the invention, device 242 includes accessories unit 242, which includes one or more additional components needed for the operation of device 200 or of components thereof. According to an embodiment of the invention, accessories unit 242 is supported by upper horizontal portion 236.

It is noted that, according to an embodiment of the invention, movable element 230 supports an inspection head that comprises multiple optical components 240.

FIG. 5 illustrates method 500 for supporting an optical component of an optical evaluation system, according to an embodiment of the invention. It is noted that conveniently, method 500 is carried out by device 200. Therefore, a person who is skilled in the art may benefit from reviewing of method 500 in the light of device 200, and vice versa.

Method 500 starts with stage 510 of receiving a request to alter a position of the optical component, the request can include a command or another control signal. The request can be responsive to information sensed by the optical component (for example when performing a focus adjustment sequence), but this is not necessarily so.

Stage 510 is followed by stage 520 of moving a movable element along at least one movement control component so as to affect the location of the optical component; wherein the optical components is supported by the movable element; wherein the at least one movement control component is connected to a sloped portion of a supporting element; wherein when the movable element supports the optical component a center of gravity of a combination of the movable element and the optical component is positioned above the sloped portion or in proximity to the sloped portion.

According to an embodiment of the invention, the moving includes moving the movable element which supports the optical component wherein the center of gravity of the combination of the movable element and the optical component is positioned substantially above a center of the sloped portion.

According to an embodiment of the invention, the moving includes moving the movable element which has a substantially rectangular cross section.

According to an embodiment of the invention, the moving includes moving the movement control element which is a magnetic rail, wherein the movable element comprises at least one armature of a linear motor.

According to an embodiment of the invention, the moving includes moving the movable element that supports an inspection head that comprises multiple optical components.

According to an embodiment of the invention, stage 520 includes stage 522 of moving the movable element along multiple movement control components that are parallel to each other; wherein the multiple movement control components are supported by multiple supporting elements.

According to an embodiment of the invention, method 500 further includes stage 530 of moving the optical component along at least one additional movement control component that is connected to the movable element; wherein the at least one additional movement control component is not parallel to the at least one movement control component.

According to an embodiment of the invention, stage 530 includes stage 532 of vertically moving the optical component along at least one additional movement control component that is connected to the movable element.

According to an embodiment of the invention, stage 530 includes stage 534 of vertically moving the optical component along at least one additional movement control component that is connected to a highly accurate vertical portion of the movable element; wherein the movable element is massive.

According to an embodiment of the invention, method 500 includes supporting at least one component by an upper horizontal portion of the movable element.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

I claim:

1. A device for supporting an optical component of an optical evaluation system, the device comprises:
   a supporting element that comprises a sloped portion;
   at least one movement control component that is coupled to the sloped portion; and
   a movable element, adapted to move along the at least one movement control component; wherein the movable element is adapted to support the optical component of the optical evaluation system;
   wherein when the movable element supports the optical component a center of gravity of a combination of the movable element and the optical component is positioned above the sloped portion or in proximity to the sloped portion; wherein the movable element is relatively massive in comparison to the optical component thereby facilitating a replacement of the optical component or adding an additional component without substantially moving the center of gravity; and wherein the movable element has a substantially triangular cross section.

2. The device according to claim 1 wherein when the movable element supports the optical component the center of gravity of the combination of the movable element and the optical component is positioned substantially above a center of the sloped portion.

3. The device according to claim 1 wherein at least one additional movement control component is coupled to the movable element; wherein the optical component is adapted to move along the at least one additional movement control component; wherein the at least one additional movement control component is not parallel to the at least one movement control component.

4. The device according to claim 1 wherein at least one additional movement control component is coupled to the movable element so as to enable vertical movement of the optical component.

5. The device according to claim 1 comprising multiple supporting elements that support multiple movement control components that are parallel to each other and facilitate only linear movement along the sloped portion.

6. The device according to claim 1 comprising a shock absorber that is connected to the supporting element.

7. The device according to claim 1 wherein the movable element is massive and comprises a highly accurate vertical portion to which at least one additional movement control component is coupled; wherein the optical component is adapted to move along the at least one additional movement control component wherein the optical component has a vertical optical axis that is directed below the moveable element.

8. The device according to claim 1 wherein the movable element has an upper horizontal portion adapted to support at least one additional component.

9. The device according to claim 1 wherein a movement control element is a magnetic rail and wherein the movable element comprises at least one armature of a linear motor.

10. The device according to claim 1 wherein the movable element supports an inspection head that comprises multiple optical components and supports an illumination block and a main optic carrier that is adapted to transfer optical signals.

11. A method for supporting an optical component of an optical evaluation system, the method comprises: receiving a request to alter a position of the optical component of the optical evaluation system; and moving a movable element along at least one movement control component so as to affect the location of the optical component; wherein the optical components is supported by the movable element; wherein the at least one movement control component is coupled to a sloped portion of a supporting element; wherein when the movable element supports the optical component a center of gravity of a combination of the movable element and the optical component is positioned above the sloped portion or in proximity to the sloped portion; wherein the movable element is relatively massive in comparison to the optical component thereby facilitating a replacement of the optical component or adding an additional component without substantially moving the center of gravity; and wherein the movable element has a substantially triangular cross section.

12. The method according to claim 11 wherein the moving comprises moving the movable element which supports the optical component wherein the center of gravity of the combination of the movable element and the optical component is positioned substantially above a center of the sloped portion.

13. The method according to claim 11 further comprising moving the optical component along at least one additional movement control component that is coupled to the movable element; wherein the at least one additional movement control component is not parallel to the at least one movement control component.

14. The method according to claim 11 further comprising vertically moving the optical component along at least one additional movement control component that is coupled to the movable element.

15. The method according to claim 11 comprising moving the movable element along multiple movement control components that are parallel to each other; wherein the multiple movement control components are supported by multiple supporting elements that facilitate only linear movement along the sloped portion.

16. The method according to claim 11 wherein the supporting element is coupled to a shock absorber.

17. The method according to claim 11 comprising vertically moving the optical component along at least one additional movement control component that is coupled to a highly accurate vertical portion of the movable element; wherein the movable element is massive; wherein the optical component has a vertical optical axis that is directed below the moveable element.

18. The method according to claim 11 comprising supporting at least one component by an upper horizontal portion of the movable element.

19. The method according to claim 11 wherein the moving comprises moving the movement control element which is a magnetic rail, wherein the movable element comprises at least one armature of a linear motor.

20. The method according to claim 11 wherein the moving comprises moving the movable element that supports an inspection head that comprises multiple optical components and supports an illumination block and a main optic carrier that is adapted to transfer optical signals.

* * * * *